United States Patent
Thyssen

(12) 
(10) Patent No.: US 6,379,217 B1
(45) Date of Patent: Apr. 30, 2002

(54) PROCESS AND DEVICE FOR DRESSING A GRINDING WORM AND FOR GRINDING PRE-CUT TOOTHED WORKPIECE

(75) Inventor: Wolfgang Thyssen, Bad Sackingen (DE)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/501,153

(22) Filed: Feb. 9, 2000

(30) Foreign Application Priority Data

Feb. 9, 1999 (DE) .......................... 199 05 136

(51) Int. Cl.[7] .............................. B24B 49/00; B24B 1/00
(52) U.S. Cl. ............................................ 451/5; 451/56
(58) Field of Search .............................. 451/5, 47, 56, 451/147, 219, 253, 275, 443; 125/11.04

(56) References Cited

U.S. PATENT DOCUMENTS

| | | | | |
|---|---|---|---|---|
| 3,897,661 A | * | 8/1975 | Inatomi et al. | 451/287 |
| 4,650,378 A | * | 3/1987 | Zubler | 409/12 |
| 4,744,179 A | * | 5/1988 | Mockli | 409/12 |
| 4,993,194 A | * | 2/1991 | Cadisch | 451/253 |
| 5,647,790 A | * | 7/1997 | Horiutchi et al. | 451/47 |
| 5,954,568 A | | 9/1999 | Wirz | |
| 6,012,972 A | * | 1/2000 | Jankowski | 451/47 |
| 6,077,150 A | * | 6/2000 | Jankowski | 451/47 |

FOREIGN PATENT DOCUMENTS

| | | |
|---|---|---|
| DE | 3234068 A1 * | 10/1983 |
| DE | 196 19 401 | 5/1996 |
| DE | 196 24 842 | 1/1998 |

OTHER PUBLICATIONS

"Calculation of the Tool Geometry for Hard Fine Finishing of Cylindrical Gears" by Weck et al., Werkstattstechnik 88(1998) H. 6, pp. 299–303.

"Profilmodifikation geschliffener Gewindeschnecken" by Van Dr.–Ing. Habil. Wojciech Kacalak et al., Werkstatt und Betrieb 117(1984) pp. 85–88.

* cited by examiner

Primary Examiner—M. Rachuba
(74) Attorney, Agent, or Firm—Sughrue Mion, PLLC

(57) ABSTRACT

A grinding worm (20) is dressed with a dressing wheel (42), which is moved along the worm path (43) during rotation of the grinding worm (20). The grinding worm as well as the dressing wheel are coupled with rotary encoders (23, 41) and with a servomotor (22, 40) each. The rotation angle of the dressing wheel is coupled by a program with the rotation angle of the grinding worm within the NC control system. Thereby the grinding pattern may be shaped on the tooth flanks (51) of the ground workpiece (50) in such a manner that the ground toothed wheel has an optimum (smooth) running quality.

5 Claims, 2 Drawing Sheets

PROCESS AND DEVICE FOR DRESSING A GRINDING WORM AND FOR GRINDING PRE-CUT TOOTHED WORKPIECE

BACKGROUND OF THE INVENTION

Toothed workpieces, particularly toothed wheels, are often pre-cut and are finished by grinding after being heat-treated. The grinding of such teeth with cylindrical grinding worms, which may be dressed, has been shown to be an efficient and cost-saving process. Dressing of such grinding worms is performed with a motor-driven dressing wheel, which is coated with hard-material grains at the working surface (see DE-OS 196 24 842, for example). Thereby the dressing wheel rotates considerably faster than the grinding worm. The dressing wheel passes along the worm path parallel to the grinding worm axis while the grinding worm is running. The longitudinal movement is coupled with the rotation angle of the grinding worm. The grinding worm meshes with the workpiece during the grinding process while the workpiece is moved parallel to its axis. The grinding worm is simultaneously shifted along its axis.

SUMMARY OF THE INVENTION

It is the object of the present invention to provide a process and device whereby workpieces, which have been ground with the grinding worm, are optimized in view of their (smooth) running quality.

The invention is based on the fact that the grinding pattern on the tooth flanks are of great significance for the running quality of a ground toothed wheel. Besides contact conditions, topography and roughness of the grinding worm flanks determine the quality of the grinding pattern. The invention is based also on the recognition of the fact that topography and roughness of the grinding worm flanks are subject to periodic fluctuations during a revolution of the grinding worm. In FIG. 1 there are shown, by separating lines, repeating segments 24 of the same topography on the flanks 44 of the grinding worm 20. These fluctuations are caused by the topography of the dressing wheel, which makes a number of revolutions during one revolution of the grinding worm. The dressing wheel actually has—for technological reasons—various grain sizes and different grain shapes as well as uneven grain distribution around the circumference, which causes a coating pattern that has a certain regularity in the active profiles. The active profiles cause periodic fluctuations of the topography of the grinding worm flanks during the grinding process, which in turn are reflected as periodic fluctuations of the grinding pattern on the tooth flanks of the workpiece. Through the coupling of the rotation angle of the grinding worm and the dressing wheel, according to the invention, in combination with the related specifically adapted shifting motion, it has been achieved that during the grinding process the periodic fluctuations of the grinding pattern are reproduced onto the workpiece flanks, in combination with the forward feeding motion of the workpiece along its axis, such that a favorable operation of the toothed wheel is obtained. The optimum coupling ratio between the rotation angle of the grinding worm and the dressing wheel may be constant or variable in a controlled manner, depending on the type of gear wheel to be produced. Since there are a number of factors that influence the process, this optimum coupling ratio is determined separately for each gearwheel as appropriate. The once determined optimum ratio is then maintained for the entire workpiece series and is also used the same way in subsequent production series. Thereby the optimum grinding pattern is reproduced with one and the same dressing disc. The same ratio is close to the optimum if another new dressing disc with the same specifications is used for the dressing process.

BRIEF DESCRIPTION OF THE DRAWINGS

An embodiment of the invention is described below with reference to the accompanying drawings, wherein.

DETAILED DESCRIPTION OF THE PREFERRED EMBODIMENT

Figure 1:
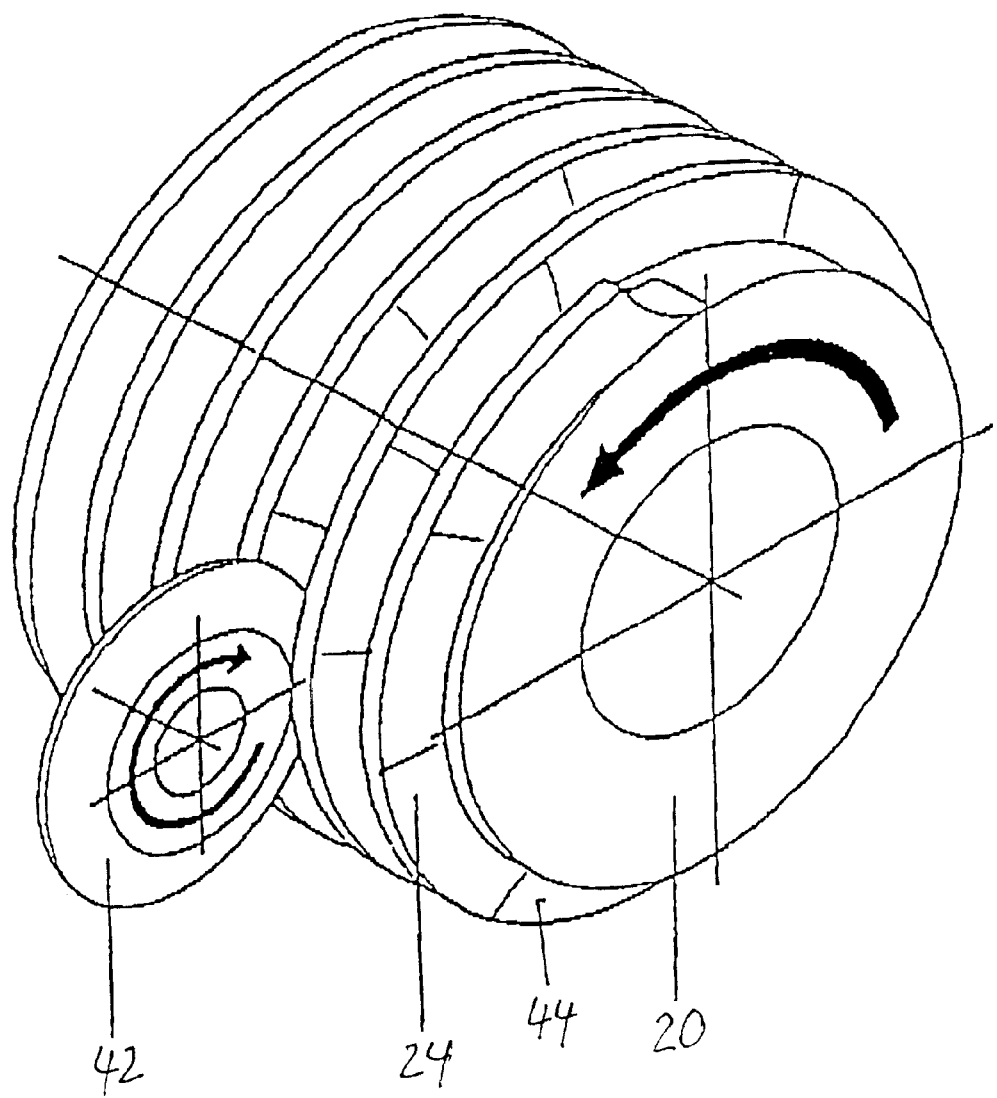
FIG. 1 shows a perspective view of a grinding worm and a dressing disc.

A first carriage 12 is displaceable by means of a motor 15 on a machine tool base 10 along a linear guide 11 perpendicular to the axis 13 of grinding spindle 14. The stroke of the carriage is measured by means of a stroke sensor 16. A second carriage 18 is displaceable on the carriage 12 in a guide 17 parallel to axis 13 by means of a motor 19. The displacement of the carriage 18 is used for shifting and for dressing of the grinding worm 20, which is mounted on a spindle 20. The stroke of the carriage 18 is measured by an additional stroke sensor 21. The grinding worm 20 is mounted on the spindle 14 in a predetermined angle position (the initial angle). The spindle 14 is driven by a servomotor 22 and is connected to a rotary encoder 23.

Another carriage 29 is displaceable along a guide 28 on the machine tool base. The guide 28 is perpendicular to guide 11 but it may also be perpendicular or oblique to the axis 13. The carriage 29 is moved by means of a servomotor 30 and its stroke is measured by means of a stroke sensor 31. A workpiece spindle 32 is mounted rotatable on the carriage 29. The spindle 32 is driven by a servomotor 33 and is connected to a rotary encoder 34.

Figure 2:
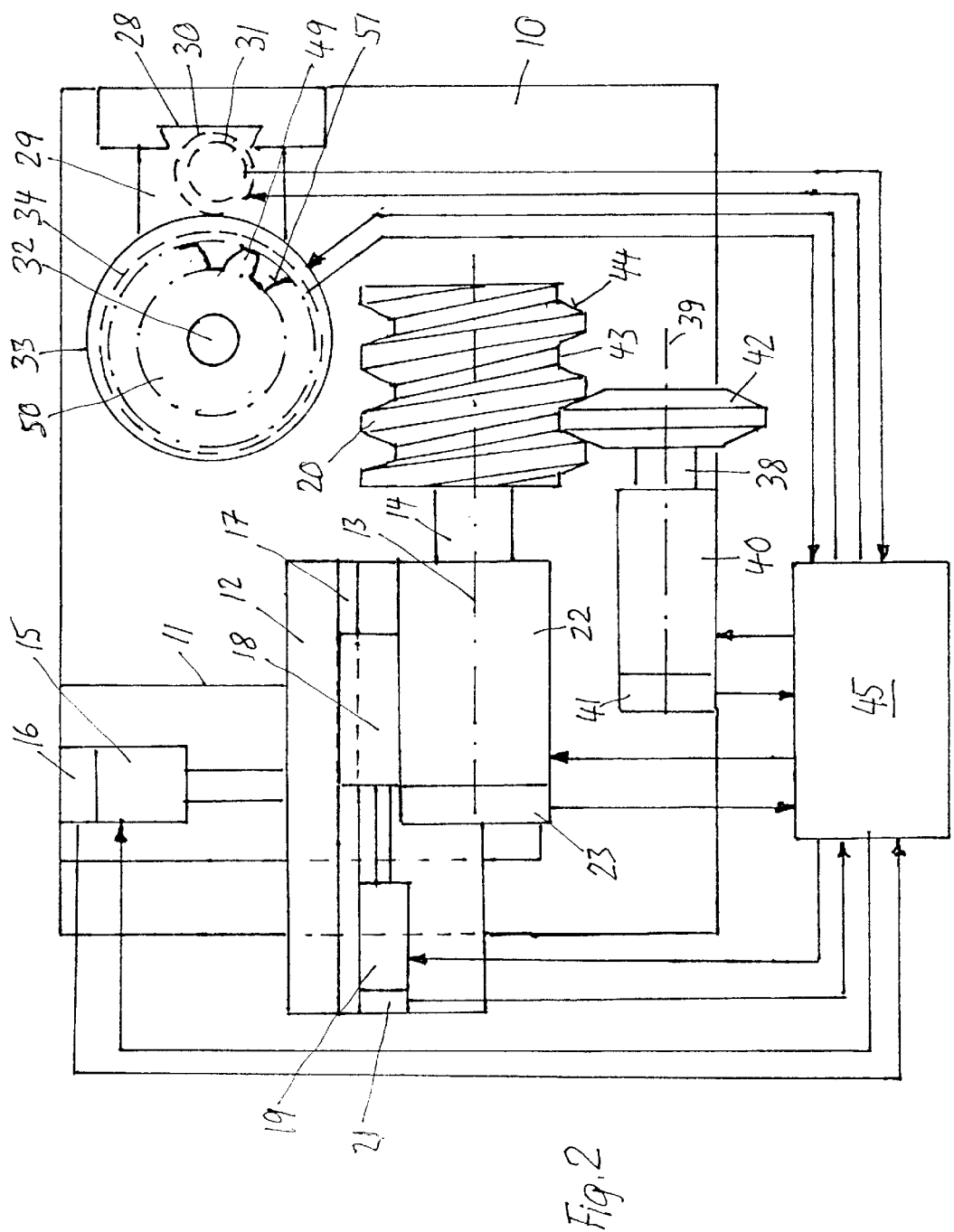
FIG. 2 shows a schematic illustration of the device according to the invention.

Additionally, a dressing spindle 38 is rotatably mounted on the machine tool base 10 for rotation around an axis 39 which may be parallel to axis 13 or inclined to the axis 13 around an axis which is parallel to the guide 11. The spindle 38 is driven by another servomotor 40 and is connected to a rotary encoder 41. A dressing disc 42 is mounted on the spindle 38 in a predetermined angle position (the initial angle). While the carriages 12, 18 are in the position illustrated in FIG. 2, the dressing disc 42 makes contact with the spiral-shaped worm path 43 of the grinding worm 20 and dresses its flanks 44.

All servomotors 15, 19, 22, 30, 33, 40 and all stroke sensors and rotary encoders 16, 21, 23, 31, 34, 41 are connected to a programmable NC control system 45. According to the invention, the rotation angle of the dressing spindle 38 is coupled by a program with the rotation angle of the grinding spindle 14 within the control system either by a constant rotation angle ratio or by a programmable function of a variable coupling ratio of the rotation angle in dependence of the grinding spindle 14 angle. In case of an even coating pattern on the dressing disc, it may be of advantage to superimpose a small stochastic variation, produced by means of a random generator, to the constant or variable coupling ratio—or to randomly (stochastically) vary the coupling ratio totally within predetermined limits. The dressing axis 39 is thereby a NC axis. In contrast, in traditional dressing devices only the number of revolutions of the dressing wheel 38 is adjusted. The rotational speed, however, fluctuates uncontrollably depending on the load factor. In addition, the initial rotation angles of the dressing spindle 38 and the grinding spindle 14 are preferably coupled with one another according to the invention. Thereby the exact same position of the tools to one another is reproduced in subsequent production series.

The carriages 12, 29 are moved in such a manner during the grinding of the teeth 49 of the workpiece 50, which is mounted on the spindle 32, that the grinding worm 20 comes into contact with the teeth 49 at one axial end of the workpiece 50. The grinding spindle rotates in a synchronized manner with the workpiece 50. The carriage 29 is moved during the grinding process in such a manner that the workpiece 50 is ground across its entire width. At the same time, the carriage 18 performs a shifting movement in the direction of axis 13 so that each point on the tooth flanks 51 of the teeth 49 matches a specific point on the tooth flanks 44 of the grinding worm 20. Through this process, the specific grinding worm topography is transferred exactly as a reproducible grinding pattern onto the teeth 49.

What is claimed is:

1. A process for grinding a pre-cut toothed workpiece, said workpiece having teeth with tooth flanks and being movable along a first axis and said workpiece being grinded by means of a cylindrical grinding worm, said grinding worm having a grinding worm path with flanks and being movable along a second axis, the process comprising the steps of:
   a) dressing said grinding worm with a dressing disc, said dressing disc having an active surface being coated with hard material grains and having a topography with a regularity, the dressing step including,
      rotating said grinding worm by means of a first servomotor, and rotating said dressing disc by means of a second servomotor, wherein said dressing disc makes a multiple number of revolutions during one revolution of said grinding worm;
      measuring a first rotation angle of said grinding worm by means of a first rotary encoder;
      measuring a second rotation angle of said dressing disc by means of a second rotary encoder; and
      coupling said first rotation angle of said grinding worm with said second rotation angle of said dressing disc, with one of an adjustable constant, a programmable variable ratio, and a stored stochastically changing ratio, wherein said topography is reproduced onto said grinding worm as a programmed pattern;
   b) bringing said grinding worm into contact with said teeth of said workpiece; and
   c) grinding said pre-cut toothed workpiece with said dressed grinding worm, the grinding step including,
      moving said workpiece along said first axis relative to said grinding worm; and
      moving said grinding worm along said second axis relative to said workpiece, so that each point on said tooth flanks matches a specific point on said flanks of said grinding worm path,
      wherein said grinding worm is moved along said second axis dependent on said first rotation angle such that said programmed pattern is reproduced onto said workpiece so that after grinding, a smooth running of said workpiece is achieved.

2. The process of claim 1, further comprising the steps of adjusting an initial rotation position of said dressing disc relative to an initial rotation angle position of said grinding worm.

3. The process of claim 1, wherein said programmable variable ratio is a function depending on said rotation angle of said grinding worm.

4. The process of claim 1, further comprising the steps of maintaining one of said programmable variable ratio and said stored stochastically changing ratio for all workpieces of a series and for all workpieces of subsequent production series.

5. A process for grinding a pre-cut toothed workpiece, said workpiece having teeth with tooth flanks and being movable along a first axis and said workpiece being grinded by means of a cylindrical grinding worm, said grinding worm having a grinding worm path with flanks and being movable along a second axis, the process comprising the steps of:
   a) dressing said grinding worm with a dressing disc, said dressing disc having an active surface being coated with hard material grains and having a topography with a regularity, the dressing step including,
      rotating said grinding worm by means of a first servomotor, and rotating said dressing disc by means of a second servomotor, wherein said dressing disc makes a multiple number of revolutions during one revolution of said grinding worm;
      measuring a first rotation angle of said grinding worm by means of a first rotary encoder;
      measuring a second rotation angle of said dressing disc by means of a second rotary encoder; and
      coupling said first rotation angle of said grinding worm with said second rotation angle of said dressing disc, with one of an adjustable constant, a programmable variable ratio, and a stored stochastically changing ratio, to form a ratio of rotational angles of said grinding worm and said dressing disc, wherein said topography is reproduced onto said grinding worm as a programmed pattern;
   b) bringing said grinding worm into contact with said teeth of said workpiece; and
   c) grinding said pre-cut toothed workpiece with said dressed grinding worm, the grinding step including,
      moving said workpiece along said first axis relative to said grinding worm; and
      moving said grinding worm along said second axis relative to said workpiece, so that each point on said tooth flanks matches a specific point on said flanks of said grinding worm path,
   wherein said grinding worm is moved along said second axis dependent on said ratio of rotational angles of said grinding worm and said dressing disc such that said programmed pattern is reproduced onto said workpiece so that after grinding, a smooth running of said workpiece is achieved.

* * * * *